(12) United States Patent
Yang

(10) Patent No.: US 8,164,471 B2
(45) Date of Patent: Apr. 24, 2012

(54) SYSTEM AND METHOD FOR DETECTING A FALLING STATE OF AN ELECTRONIC DEVICE

(75) Inventor: Sheng-Hsiung Yang, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 370 days.

(21) Appl. No.: 12/479,829

(22) Filed: Jun. 7, 2009

(65) Prior Publication Data

US 2010/0045525 A1     Feb. 25, 2010

(30) Foreign Application Priority Data

Aug. 22, 2008   (CN) .......................... 2008 1 0304140

(51) Int. Cl.
*G08B 21/00* (2006.01)
(52) U.S. Cl. ................. 340/669; 340/539.13; 340/686.1
(58) Field of Classification Search .................. 340/540, 340/568.1, 686.1, 571, 572, 539.1, 669
See application file for complete search history.

(56) References Cited

U.S. PATENT DOCUMENTS

| 6,459,988 | B1* | 10/2002 | Fan et al. ...................... 701/213 |
| 2005/0046580 | A1* | 3/2005 | Miranda-Knapp et al. .......................... 340/686.1 |
| 2007/0159343 | A1* | 7/2007 | Crucilla ...................... 340/573.4 |
| 2008/0117042 | A1* | 5/2008 | Hyde et al. .................... 340/540 |

FOREIGN PATENT DOCUMENTS

CN         101102375         1/2008

* cited by examiner

*Primary Examiner* — Benjamin C Lee
*Assistant Examiner* — Hongmin Fan
(74) *Attorney, Agent, or Firm* — Altis Law Group, Inc.

(57) ABSTRACT

A system and method for detecting a falling state of an electronic device include setting a time interval to collect position information of the electronic device and one or more alarm means, activating a global position system to locate a position of the electronic device, and acquiring position information of the electronic device at each time interval. The system and method further include calculating an acceleration of the electronic device, and activating one or more of the alarm means if the calculated acceleration is larger or equal to the acceleration of gravity.

15 Claims, 2 Drawing Sheets

SYSTEM AND METHOD FOR DETECTING A FALLING STATE OF AN ELECTRONIC DEVICE

BACKGROUND

1. Technical Field

Embodiments of the present disclosure relate to systems and methods for detecting motion of an electronic device, and more particularly to a system and method for detecting a falling state of the electronic device.

2. Description of Related Art

Electronic devices are easily lost by people. Once electronic devices have fallen out from pockets or bags of people, it is difficult to find out where the electronic devices are, especially when people are walking/moving.

What is needed, therefore, is an improved system and method for detecting a falling state of the electronic device.

DETAILED DESCRIPTION

All of the processes described may be embodied in, and fully automated via, functional code modules executed by one or more general purpose computers or processors. The code modules may be stored in any type of computer-readable medium or other storage device. Some or all of the methods may alternatively be embodied in specialized computer hardware or electronic apparatus.

Figure 1:
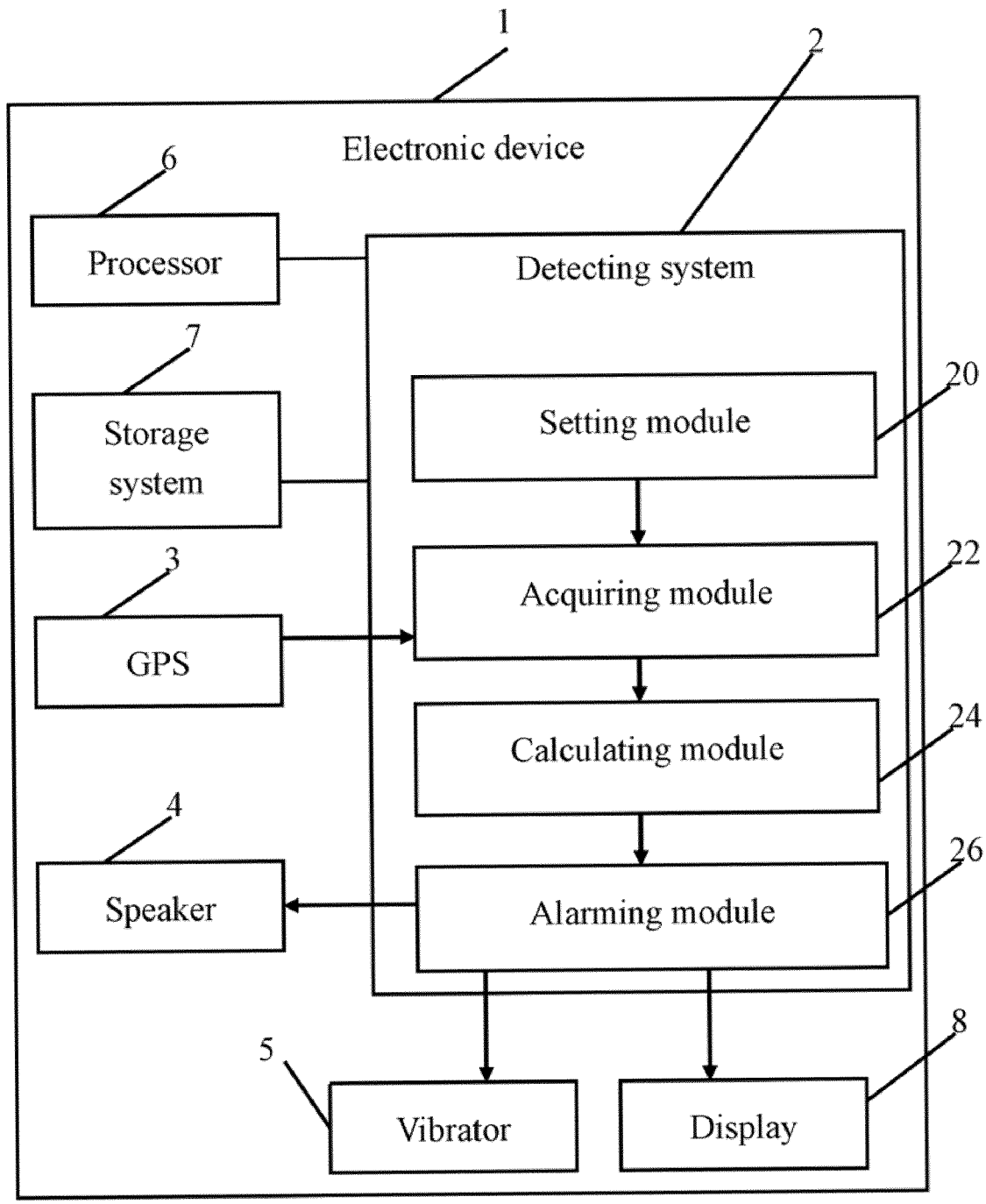
FIG. 1 is a block diagram of one embodiment of a system for detecting a falling state of an electronic device.

FIG. 1 is a block diagram of one embodiment of a system 2 for detecting a falling state of an electronic device 1 (hereinafter referred to as "the detecting system 2"). In one embodiment, the detecting system 2 is included in a computer readable medium of the electronic device 1. In another embodiment, the detecting system 2 may be included in an operating system of the electronic device 1. The electronic device 1 may be a mobile phone, a personal digital assistant (PDA), or any other kind of computing device, for example.

The electronic device 1 may include a global position system (GPS) 3, a speaker 4, a vibrator 5, a processor 6, a storage system 7, and a display 8. The GPS 3 is operable to locate a position of the electronic device 1. The speaker 4 may output audio signals, such as songs, rings, etc. The vibrator 5 may vibrate the electronic device 1 when a vibration mode provided by the electronic device 1 is selected. The display 8 may display various information, such as messages, images, videos, and so on.

The processor 6 executes one or more computerized operations of the electronic device 1 and other applications, to provide functions of the electronic device 1. The storage system 7 stores one or more programs, such as programs of an operating system, other applications of the electronic device 1, and various kinds of data, such as songs, images, messages, etc. In one embodiment, the electronic device 1 may be a mobile phone, and the storage system 7 may be a memory of the electronic device 1 or an external storage card, such as a memory stick, a Subscriber Identification Module (SIM) card, a smart media card, a compact flash card, or any other type of memory card.

In one embodiment, the electronic device 1 includes a setting module 20, an acquiring module 22, a calculating module 24, and an alarming module 26. The modules 20, 22, 24, and 26 may be executed by the processor 6 to perform one or more operations of the electronic device 1, such as detecting if the electronic device 1 is in a falling state.

The setting module 20 sets a time interval to collect position information of the electronic device 1. The time interval may be set at 0.01 seconds, for example. The setting module 20 also sets a hotkey to enable/disable the detecting system 2. In one embodiment, the hotkey may be any key-press or a key-press combination on the electronic device 1. In another embodiment, the hotkey may be a character string including alphanumeric characters and/or symbols, such as "#detecting#."

The setting module 20 further sets one or more alarm means to alarm a user of the electronic device 1 when the electronic device is in a falling state. In one embodiment, the alarm means may include an audible alarm, a vibration alarm, a blinking alarm, and/or any combination of the above-mentioned alarms.

The acquiring module 22 activates the GPS 3 to locate a position of the electronic device 1, and acquires position information of the electronic device 1 from the GPS 3 at each time interval. The position information may include longitude, latitude, and altitude of the electronic device 1.

The acquiring module 22 further acquires a current altitude value of the electronic device 1 from current position information acquired from the GPS 3, and stores the current altitude value into the storage system 7. Depending on the embodiment, the setting module 20 may allocate specified storage space to store a plurality of altitude values of the electronic device 1, and clear the plurality of altitude values when the detecting system 2 is disabled/turned off.

The calculating module 24 determines a previous altitude value acquired in a previous time interval, and calculates an altitude difference between the current altitude value and the previous altitude value of the electronic device 1. The calculating module 24 further determines if the altitude difference is larger than zero, and calculates an acceleration of the electronic device 1 according to the altitude difference and the time interval if the altitude difference is larger than zero.

The alarming module 26 determines if the calculated acceleration is larger or equal to the acceleration of gravity (e.g., $9.81 \text{ m/s}^2$). If the calculated acceleration is larger or equal to the acceleration of gravity, the alarming module 26 detects that the electronic device 1 is in a falling state. If the calculated acceleration is less than the acceleration of gravity, the alarming module 26 determines that the electronic device 1 is in a normal state.

The alarming module 24 further activates one or more of the alarm means when the electronic device 1 is in a falling state, such as outputting audio alerts through the speaker 4, vibrating the electronic device 1 through the vibrator 5, and/or blinking through the display 8. In one embodiment, the output audio alerts may be a specified song, or specified ring tone.

Figure 2:
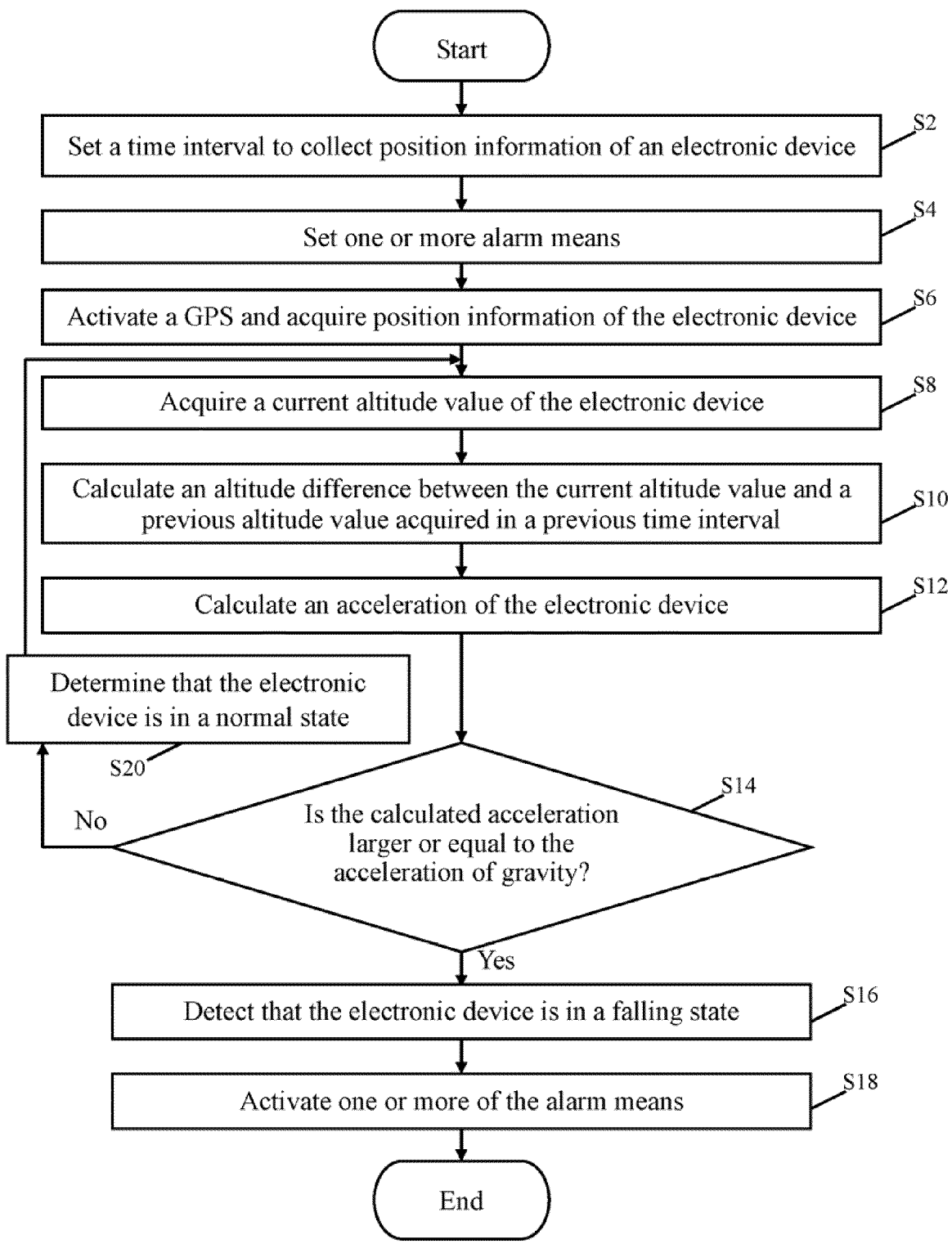
FIG. 2 is a flowchart of one embodiment of a method for detecting a falling state of the electronic device of FIG. 1.

FIG. 2 is a flowchart of one embodiment of a method for detecting a falling state of the electronic device 1 of FIG. 1. Depending on the embodiment, additional blocks may be added, others removed, and the ordering of the blocks may be replaced.

In block S2, the setting module 20 sets a time interval to collect position information of the electronic device 1, and sets a hotkey to enable/disable the detecting system 2. The time interval may be set at 0.01 seconds, for example.

In block S4, the setting module 20 sets one or more alarm means to alarm a user of the electronic device 1 when the electronic device is in a falling state. In one embodiment, the alarm means may include an audible alarm, a vibration alarm, a blinking alarm, and/or any combination of the above-mentioned alarms.

In block S6, the acquiring module 22 activates the GPS 3 to locate a position of the electronic device 1 when the detecting system 2 is enabled, and acquires position information of the electronic device 1 from the GPS 3 at each time interval. As mentioned above, the position information may include longitude, latitude, and altitude of the electronic device 1.

In block S8, the acquiring module 22 acquires a current altitude value of the electronic device 1 from current position information acquired from the GPS 3, and stores the current altitude value into the storage system 7.

In block S10, the calculating module 24 determines a previous altitude value acquired in a previous time interval, and calculates an altitude difference between the current altitude value and the previous altitude value of the electronic device 1.

In block S12, the calculating module 24 calculates an acceleration of the electronic device 1 according to the altitude difference and the time interval.

In block S14, the alarming module 26 determines if the calculated acceleration is larger or equal to the acceleration of gravity. If the calculated acceleration is larger or equal to the acceleration of gravity, in block S16, the alarming module 26 detects that the electronic device 1 is in a falling state.

In block S18, the alarming module 26 activates one or more of the alarm means when the electronic device 1 is in a falling state, such as outputting audio alerts through the speaker 4, vibrating the electronic device 1 through the vibrator 5, and/or blinking through the display 8. In one embodiment, the output audio alerts may be a specified song, or specified ring tone.

If the calculated acceleration is less than the acceleration of gravity, in block S20, the alarming module 26 determines that the electronic device 1 is in a normal state, and then the procedure returns to block S8.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A method for detecting a falling state of an electronic device using a detecting system of the electronic device, the electronic device comprising a global position system (GPS), the method comprising:

setting a time interval to collect position information of the electronic device, and setting a hotkey to enable/disable the detecting system;

setting one or more alarm means to alarm when the electronic device is in a falling state;

activating the GPS to locate a position of the electronic device;

acquiring position information of the electronic device from the GPS at each time interval, the position information comprising an altitude value of the electronic device;

acquiring a current altitude value of the electronic device;

calculating an altitude difference between the current altitude value and a previous altitude value acquired in a previous time interval, and calculating an acceleration of the electronic device according to the altitude difference and the time interval;

determining if the calculated acceleration is larger or equal to the acceleration of gravity;

detecting that the electronic device is in a falling state if the calculated acceleration is larger or equal to the acceleration of gravity; and activating one or more of the alarm means when the electronic device is in a falling state.

2. The method according to claim 1, further comprising: determining that the electronic device is in a normal state if the calculated acceleration is less than the acceleration of gravity, and returning to the acquiring step.

3. The method according to claim 1, wherein the one or more alarm means comprise an audible alarm, a vibration alarm, a blinking alarm, and a combination of the audible alarm, the vibration alarm, and/or the blinking alarm.

4. The method according to claim 3, wherein the step of activating one or more of the alarm means when the electronic device is in a falling state comprises:

outputting audio alerts through a speaker of the electronic device;

vibrating the electronic device through a vibrator of the electronic device; and/or blinking through a display of the electronic device.

5. The method according to claim 1, further comprising: allocating storage space to store acquired altitude values of the electronic device.

6. A computing system for detecting a falling state of an electronic device, the computing system comprising:

a global position system (GPS);

a storage system;

at least one processor; and one or more programs stored in the storage system and being executable by the at least one processor, the one or more programs comprising:

a setting module operable to set a time interval to collect position information of the electronic device, and set one or more alarm means to alarm when the electronic device is in a falling state, and further set a hotkey to enable or disable the computing system;

an acquiring module operable to activate the GPS to locate a position of the electronic device, acquire position information of the electronic device from the GPS at each time interval, the position information comprising an altitude value of the electronic device, and acquire a current altitude value of the electronic device;

a calculating module operable to calculate an altitude difference between the current altitude value and a previous altitude value acquired in a previous time interval, and calculate an acceleration of the electronic device according to the altitude difference and the time interval; and an alarming module operable to determine if the calculated acceleration is larger or equal to the acceleration of gravity, detect that the electronic device is in a falling state if the calculated acceleration is larger or equal to the acceleration of gravity, and activate one or more of the alarm means when the electronic device is in a falling state.

7. The computing system according to claim 6, wherein the alarming module is further operable to determine that the electronic device is in a normal state if the calculated acceleration is less than the acceleration of gravity.

8. The computing system according to claim 6, wherein the one or more alarm means comprise an audible alarm, a vibration alarm, a blinking alarm, and a combination of the audible alarm, the vibration alarm, and/or the blinking alarm.

9. The computing system according to claim 8, wherein the alarming module is further operable to output audio alerts through a speaker of the electronic device, vibrate the electronic device through a vibrator of the electronic device, and/or blink through a display of the electronic device.

10. The computing system according to claim 6, wherein the setting module is further operable to allocate storage space to store acquired altitude values of the electronic device.

11. A storage medium storing a set of instructions, the set of instructions capable of being executed by a processor to perform a method for detecting a falling state of an electronic device using a detecting system of the electronic device, the electronic device comprising a global position system (GPS), the method comprising:

setting a time interval to collect position information of the electronic device and setting a hotkey to enable/disable the detecting system;

setting one or more alarm means to alarm when the electronic device is in a falling state;

activating the GPS to locate a position of the electronic device;

acquiring position information of the electronic device from the GPS at each time interval, the position information comprising an altitude value of the electronic device;

acquiring a current altitude value of the electronic device;

calculating an altitude difference between the current altitude value and a previous altitude value acquired in a previous time interval, and calculating an acceleration of the electronic device according to the altitude difference and the time interval;

determining if the calculated acceleration is larger or equal to the acceleration of gravity;

detecting that the electronic device is in a falling state if the calculated acceleration is larger or equal to the acceleration of gravity; and activating one or more of the alarm means when the electronic device is in a falling state.

12. The storage medium as claimed in claim 11, wherein the method further comprises:

determining that the electronic device is in a normal state if the calculated acceleration is less than the acceleration of gravity, and returning to the acquiring step.

13. The storage medium as claimed in claim 11, wherein the one or more alarm means comprise an audible alarm, a vibration alarm, a blinking alarm, and a combination of the audible alarm, the vibration alarm, and/or the blinking alarm.

14. The storage medium as claimed in claim 13, wherein the step of activating one or more of the alarm means when the electronic device is in a falling state comprises:

outputting audio alerts through a speaker of the electronic device;

vibrating the electronic device through a vibrator of the electronic device; and/or blinking through a display of the electronic device.

15. The storage medium as claimed in claim 11, wherein the method further comprises:

allocating storage space to store acquired altitude values of the electronic device.

* * * * *